US008463652B2

(12) United States Patent  
de Boer et al.

(10) Patent No.: US 8,463,652 B2  
(45) Date of Patent: *Jun. 11, 2013

(54) METHOD AND SYSTEM TO FACILITATE ON-LINE TRADING

(75) Inventors: Michiel de Boer, San Francisco, CA (US); Yung Ho Kang, Cupertino, CA (US); Michael Paul Raneri, San Francisco, CA (US)

(73) Assignee: TradeKing Group, Inc., Fort Lauderdale, FL (US)

( * ) Notice: Subject to any disclaimer, the term of this patent is extended or adjusted under 35 U.S.C. 154(b) by 153 days.

This patent is subject to a terminal disclaimer.

(21) Appl. No.: 12/779,255

(22) Filed: May 13, 2010

(65) Prior Publication Data

US 2010/0332340 A1     Dec. 30, 2010

Related U.S. Application Data

(63) Continuation-in-part of application No. 12/491,762, filed on Jun. 25, 2009.

(51) Int. Cl.
*G06Q 40/00*         (2012.01)

(52) U.S. Cl.
USPC .................. 705/26; 705/35; 705/38; 705/37; 705/67; 715/234; 715/60; 707/706; 709/236; 380/279; 726/3

(58) Field of Classification Search
CPC ..... G06Q 30/06; G06Q 30/02; G06Q 30/0603; G06Q 30/00; G06Q 30/08
USPC .......................................................... 705/26
See application file for complete search history.

(56) References Cited

U.S. PATENT DOCUMENTS

| 5,819,271 A | 10/1998 | Mahoney et al. |
| 6,282,548 B1 | 8/2001 | Burner et al. |
| 6,515,681 B1 | 2/2003 | Knight |

(Continued)

FOREIGN PATENT DOCUMENTS

WO    WO-2010151383 A1    12/2010

OTHER PUBLICATIONS

While InNexus Biotech Corp. Announce Re-Showing of Interview, Others Announce; Director Feature, File Petition, Announce CEO Presentation, Quarter Results, and Approve Stock Split; M2 Presswire, NA; Mar. 5, 2007.*

(Continued)

*Primary Examiner* — Tien Nguyen  
(74) *Attorney, Agent, or Firm* — Schwegman Lundberg & Woessner, P.A.

(57) ABSTRACT

A method and system to facilitate on-line transactions is presented. An example system, in one embodiment, comprises a content scanner, a security symbol resolver, a web page manipulator, an event detector, and a trading ticket activator. The content scanner may be configured to scan a web page in order to detect security symbol information. The page manipulator may be configured to insert a trading control into the web page to produce a trade-enabled web page. The trading control may be used by users accessing the trade-enabled web page to initiate trades using the trading service associated with the trading control. The system may be provided on a client (e.g., as a browser plug-in) or on a server, as a trading access module associated with a particular web site.

30 Claims, 12 Drawing Sheets

U.S. PATENT DOCUMENTS

| | | | |
|---|---|---|---|
| 6,563,514 B1 | 5/2003 | Samar | |
| 6,636,856 B2 | 10/2003 | Pasquali | |
| 6,859,212 B2 | 2/2005 | Kumar et al. | |
| 7,065,483 B2 | 6/2006 | Decary et al. | |
| 7,146,335 B2 | 12/2006 | Rose | |
| 7,165,044 B1* | 1/2007 | Chaffee | 705/37 |
| 7,242,669 B2* | 7/2007 | Bundy et al. | 370/252 |
| 8,027,893 B1* | 9/2011 | Burrows et al. | 705/35 |
| 2001/0049651 A1 | 12/2001 | Selleck | |
| 2002/0019810 A1* | 2/2002 | Kumar et al. | 705/42 |
| 2002/0023040 A1* | 2/2002 | Gilman et al. | 705/37 |
| 2002/0049666 A1* | 4/2002 | Reuter et al. | 705/37 |
| 2002/0077930 A1 | 6/2002 | Trubey et al. | |
| 2002/0095651 A1 | 7/2002 | Kumar et al. | |
| 2004/0193524 A1* | 9/2004 | Almeida et al. | 705/36 |
| 2004/0236668 A1* | 11/2004 | Toffey | 705/37 |
| 2004/0254881 A1 | 12/2004 | Kumar et al. | |
| 2005/0038707 A1* | 2/2005 | Roever et al. | 705/21 |
| 2005/0154662 A1 | 7/2005 | Langenwalter | |
| 2005/0261836 A1* | 11/2005 | Meng et al. | 702/19 |
| 2006/0069635 A1* | 3/2006 | Ram et al. | 705/37 |
| 2006/0168509 A1 | 7/2006 | Boss et al. | |
| 2006/0230011 A1 | 10/2006 | Tuttle et al. | |
| 2007/0027672 A1 | 2/2007 | Decary et al. | |
| 2007/0208751 A1 | 9/2007 | Cowan et al. | |
| 2007/0265954 A1 | 11/2007 | Mather et al. | |
| 2007/0276841 A1 | 11/2007 | Rhoads et al. | |
| 2008/0040681 A1 | 2/2008 | Synstelien et al. | |
| 2008/0065737 A1 | 3/2008 | Burke et al. | |
| 2008/0114709 A1 | 5/2008 | Dixon et al. | |
| 2008/0172598 A1 | 7/2008 | Jacobsen et al. | |
| 2008/0195954 A1 | 8/2008 | Dharmarajan et al. | |
| 2008/0205655 A1 | 8/2008 | Wilkins et al. | |
| 2010/0332366 A1 | 12/2010 | de Boer et al. | |

OTHER PUBLICATIONS

New GRC Solutions from SAP Help Mitigate Trade Risk Across Global Supply Chain; PR Newswire, p. NA; Mar. 18, 2009.*

"International Application No. PCT/US2010/034859, Search Report mailed Jul. 13, 2010", 2 Pgs.

"International Application No. PCT/US2010/034859, Written Opinion mailed Jul. 13, 2010", 7 Pgs.

"Equity Pilot—Research Assistant", [Online]. Retrieved from the Internet: <URL: https://addons.mozilla.org/en-US/firefox/addon/9475/>, (May 19, 2010), 5 pgs.

"GetGlue", [Online]. Retrieved from the Internet: <URL: http://getglue.com/>, (May 19, 2010), 2 pgs.

"Glue—Recommendations for Books/Movies/Music 4.5.21", [Online]. Retrieved from the Internet: <URL: https://addons.mozilla.org/en-US/firefox/addon/3481/>, (May 19, 2010), 5 pgs.

"U.S. Appl. No. 12/491,762, Response filed Mar. 13, 2012 to Non Final Office Action mailed Dec. 13, 2011", 11 pgs.

"U.S. Appl. No. 12/491,762, Non Final Office Action mailed Dec. 13, 2011", 12 pgs.

"International Application No. PCT/US2010/034859, International Preliminary Report on Patentability Mailed Jan. 12, 2012", 9 pgs.

* cited by examiner

METHOD AND SYSTEM TO FACILITATE ON-LINE TRADING

RELATED APPLICATIONS

This application is a continuation-in-part of U.S. patent application Ser. No. 12/491,762, filed on Jun. 25, 2009, which is incorporated herein by reference in its entirety.

TECHNICAL FIELD

This application relates to the field of computer software and hardware, specifically to a computer-implemented method and system to facilitate on-line trading.

BACKGROUND

The Internet has made it possible for computer users all over the world to interact and communicate electronically. Such electronic communication supports trading in currencies, stocks, commodities and some of the newer forms of securities such as derivatives and the like, as opposed to the traditional trading "floor," in which traders would need to be physically present in order to place buy and sell orders.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
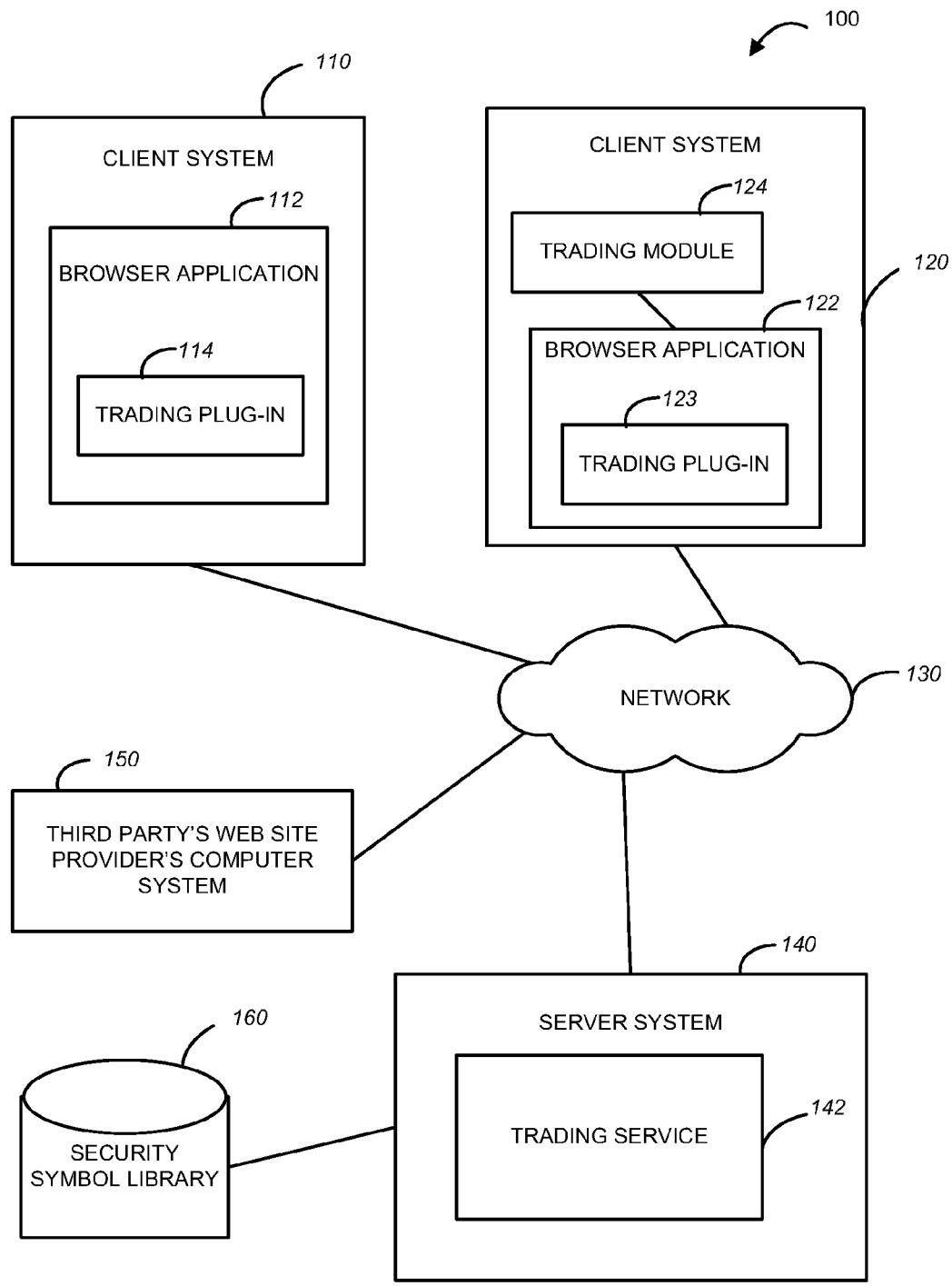
FIG. 1 is a diagrammatic representation of a network environment within which an example method and system to facilitate on-line trading using a certain trading platform may be implemented.

Internet traders generally use a wide variety of online sources for their investing research. At the same time, the timing of execution is an important aspect of a trader's success. When traders find actionable content (e.g., information related to securities) on a website it takes a couple of steps, and hence time, to act upon this information. For the purposes of this description, a security is a financial instrument that can be publicly traded on an (electronic) exchange. Securities include, but are not limited to common stocks, derivative (finance), currencies, commodities, and certain over-the-counter (OTC) products.

An example method and system to facilitate on-line trading may allow for a near-instantaneous response whenever a trader detects a piece of information on any website, and wishes (or at least considers) to immediately act upon that information.

A computer-implemented system and method to facilitate on-line trading may be provided to permit users to access a trading center (e.g., an on-line trading service hosted by a server system of a provider that may be referred to as a trading server) in a semi-automated manner, from any website that contains potentially actionable content that can be resolved into a known security symbol. For the purposes of this description, potentially actionable content that can be resolved into a known security symbol may be referred to as security symbol information. Security symbol information may include, e.g., stock symbols, Committee on Uniform Security Identification Procedures (CUSIP) identifiers, or the corresponding names of publicly traded companies, information associated with commodities, information associated with currencies, etc. In one example embodiment, permitting users to access a trading center from any website that contains potentially actionable content may be achieved by utilizing a client-side module, such as, for example, a desk top application, a widget, a browser plug-in or a tool bar, that is in communication with a trading server and is configured to scan the web page presented by the browser for any text containing a known security symbol or any other media (e.g., video, audio, image) or code (e.g., format, tag, bookmark, cookie) that can be resolved into a known security symbol. In one embodiment, the scanning of a web page may be performed only with respect to those web pages that were identified by the client-side trading access module as associated with a financial or investing website. In other embodiments, all web pages loaded by the browser may be scanned for information indicative of a security symbol, such as the actual security symbols, CUSIP identifiers, or the names of companies.

The information indicative of a security symbol may be determined as a result of the scanning of a web page using a configuration file that contains semantic patterns associated with websites, web pages and Internet locations. The client-side trading access module may then display a recognizable visual control (e.g., a brightly-colored "Z") next to the security symbol or next to the name of a company that has an associated security symbol. The visual control, termed a "trading control," may be invoked or triggered, e.g., by clicking on the trading control or by merely hovering over the trading control. The triggering of the trading control, in one embodiment, may cause the client-side trading access module to activate a secure trading ticket that may be pre-filled with information associated with the security symbol or information associated with the user's trading account.

The trading ticket may be presented as a draggable overlay on the web page, so it may not require the user to open a new browser window. As mentioned above, the trading ticket may be pre-filled with the resolved security symbol, relevant (financial) data associated with the security symbol (such as, e.g., the last trade, bid, ask, volume, analyst ratings, community data), and may also indicate relevant trading account information (e.g., buying power) in order to aid the user to make a fast and easy trading decision. The trading ticket may require minimum additional information to be entered by the user (e.g., buy/sell, market/limit) to complete the order for submission. Various options to pull and display additional relevant information from the trading server may also be provided via the client-side module. The orders submitted utilizing the trading ticked described above may be handled in the same way as any trading orders submitted directly from the trading service provider's website. An example method and system to facilitate on-line trading may be implemented in the context of a network environment 100 illustrated in FIG. 1.

As shown in FIG. 1, the network environment 100 may include client systems 110 and 120 and a server system 140. The server system 140, in one example embodiment, may host a trading service module 142 providing an on-line trading service. The client systems 110 and 120 may run respective browser applications 112 and 122 and may also host respective client-side trading access modules. A client side trading access module, in one example embodiment, may be provided to facilitate access to the trading service provided by the trading service module 142 from web pages that are not associated with the provider of the trading service (e.g., a web page associated with a financial website provider's computer system 150).

A client-side trading access module may be implemented, e.g., as a browser plug-in (e.g., a trading plug-in 114 at the client system 110), a browser toolbar (not shown), a desk top module (e.g., a trading access module 124 at the client system 120), etc. The trading access module 124 may be configured to communicate with the trading service module 142 hosted by the server system 140 via a communication plug-in 123 provided with the browser application 122. A client-side trading access module may have access to the trading service module 142 hosted by the server system 140 via a communications network 130. The communications network 130 may be a public network (e.g., the Internet, a wireless network, etc.) or a private network (e.g., a local area network (LAN), a wide area network (WAN), Intranet, etc.). The trading service module 142 may use a security symbol library 160, as well as a financial sites library (not shown) in order to accommodate requests from client-side trading access modules.

In one example embodiment, the trading plug-in 114 (or the communication plug-in 123 associated with the trading access module 124) comprises a JavaScript code and a configuration file. "JavaScript™" is a trademark of Sun Microsystems. The JavaScript code, in one embodiment, comprises a plurality of modules configured to perform various functions, as described further below. The configuration file may serve to recognize relevant websites (including domains and/or sub domains) that may present financial information. The configuration file may also direct the trading plug-in 114 to include certain pages available on a financial web site but exclude some pages (e.g., personal finance pages of users). The configuration file may also include information associated with respective locations of web pages that are likely to include a security symbol or related information such as company name. In one embodiment, in order to determine respective locations of web pages that are likely to include a security symbol or related information, the configuration file may be adapted to recognize HTML tags (e.g., <h1>), specific text (e.g., "Last trade:"), contextual information such as a URL string (e.g., http://finance.yahoo.com/q?s=AAPL), etc. In one embodiment, the scanning of a web page and recognizing of security symbol information can be based on any information that is present in media (e.g., video, audio, image) or code (e.g., format, tag, bookmark, cookie) that is involved in the web browsing session.

For each combination of website/page/location recognized by the configuration file, the JavaScript code performs a scan for security symbols (or related information like CUSIP identifiers or company names). In one embodiment, when it is determined that a certain web page is associated with a financial web site and is not subject to exclusion according to the settings of the configuration file, the scanning of the web page may be either generic or tailored specifically to that web page.

In one example embodiment, the configuration file determines whether a certain web page should be subject to the scanning process. When the scanning of the web page suggested by the configuration file is performed, any determined securities symbols may be verified against the symbol library 160. For each security symbol (or related information like CUSIP identifier or company name) identified by the JavaScript code, a visual control is added to the web page.

A configuration file provided with the trading plug-in 114 may be periodically updated or replaced with the latest version available at the trading server 140. For example, when the browser application 112 is launched and the plug-in 114 is activated, the plug-in 114 connects to the server system 140 and obtains the latest version of the configuration file. Alternatively, the configuration file may be updated automatically, according to a predetermined update schedule. An example client-side trading access module may be described with reference to FIG. 2.

Figure 2:
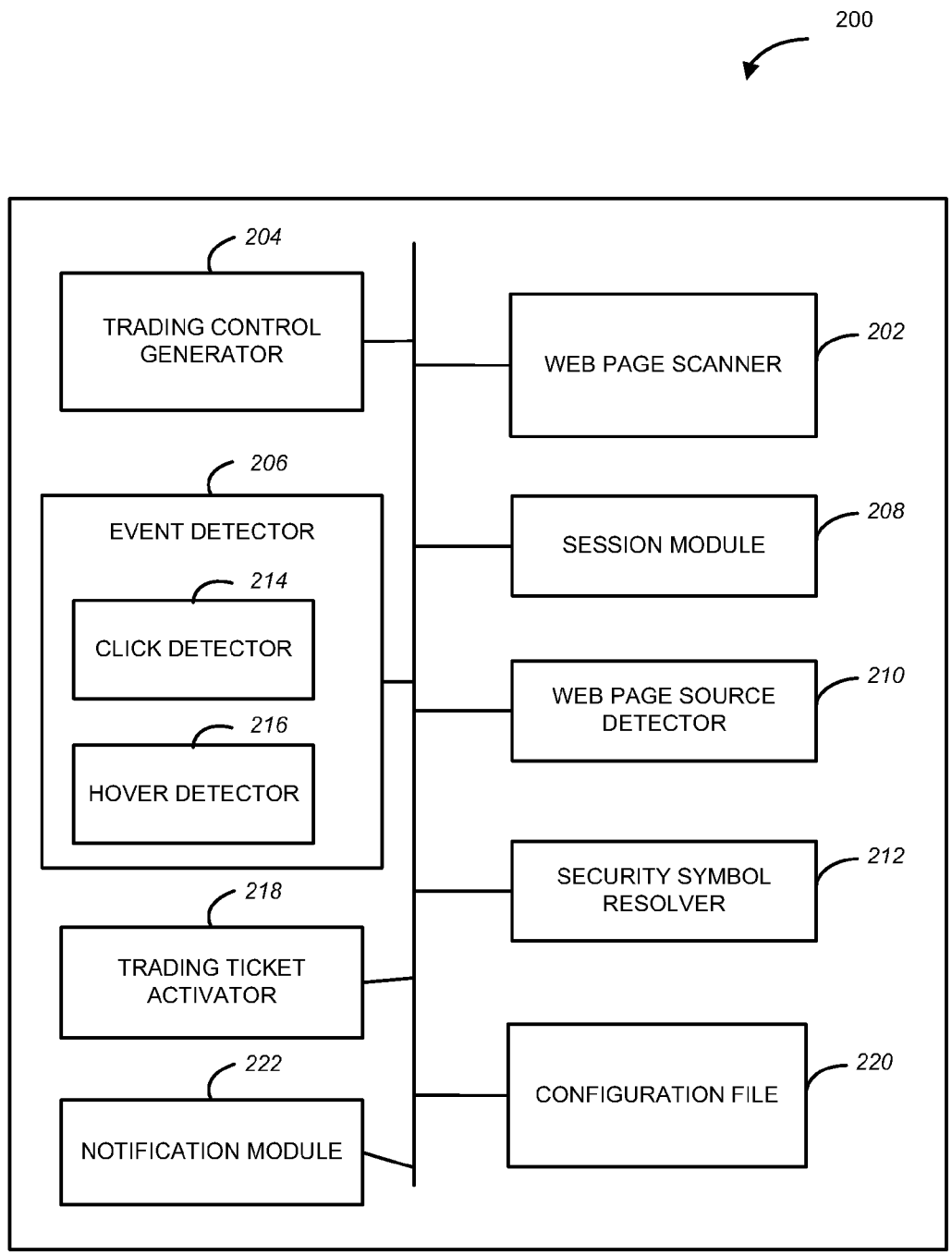
FIG. 2 is block diagram of a client-side trading access module, in accordance with one example embodiment.

FIG. 2 is a block diagram of a system 200 to facilitate on-line trading, in accordance with one example embodiment. The system 200 may correspond to the plug-in 114 of FIG. 1. As shown in FIG. 2, the system 200, in one embodiment, comprises a web page scanner 202, a trading control generator 204, an event detector 206, and a trading ticket activator 218. The web page scanner 202 may be configured to scan a web page in order to detect security symbol information. The trading control generator 204 may be configured to present a trading control to associate visually the trading control with the detected security symbol information. The trading control may be activated in order to access a trading service. A trading control may be, for example, an actionable icon or some other control that could be activated by clicking or double clicking on the icon, by positioning a cursor over the icon, or by some other action or input such as, e.g., a market data feed (e.g., price change, news event). The event detector 206 may be configured to detect an event associated with the trading control (e.g., a click), so that the trading ticket activator 218 receives a request to launch a trading ticket associated with the security symbol information. In one embodiment, the event detector 206 may include a click detector 214 to detect click events and a hover detector 216 may be configured to detect hover events. As mentioned above, a trading ticket may be then utilized by a user for submitting a security order using the trading service.

The trading ticket activator 218 may also be configured to obtain, from the trading service, data suitable for pre-filling the trading ticket (e.g., the security symbol, relevant (financial) data associated with the security symbol, and relevant trading account information) and to pre-fill the trading ticket with the obtained data. As is described in further detail below, the system 200 can be used to facilitate on-line trading for a user through a certain trading service when the user has an account with the trading service and when a secure session has been established for the user.

The system 200 may also include a session module 208, a web page source detector 210, and a security symbol resolver 212. The session module 208 may be configured to determine whether a user associated with the event associated with the trading control has an account with the trading service and whether a secure session with the trading service has been established for the user. The web page source detector 210 may be configured to determine whether the web page currently loaded by the associated browser is a relevant financial or investing web page, which may be achieved by sending a match request to the trading service that may have access to a library of relevant financial and investing websites. The security symbol resolver 212 may be configured to communicate, to the trading service, a request to resolve a security symbol information (e.g., to provide a security symbol that corresponds to the security symbol information, such as the name of a company, or to confirm that the security symbol detected on a web page is a valid security symbol). The security symbol resolver 212 may also be configured to receive a resolved security symbol from the trading service. In some embodiments, the web page scanner 202 utilizes a configuration file 220 for scanning web pages and determining security symbols based on semantic patterns provided in the configuration file 220 so that the security symbol resolver 212 may not be necessary.

Also shown in FIG. 2 is a notification module 222. The notification module 222 may be configured to receive, from the trading service 142 of FIG. 1, messages associated with the disposition of respective submitted orders and generate notifications for the user, e.g., in the form of a pop-up window, status bar extension, sound, or otherwise. For example, the trading service 142 may report to the system 200 that the submitted order was accepted, rejected, executed, or cancelled. In response, the notification module 222 may generate a pop-up window, status bar extension, sound, or otherwise, to present the received message from the trading service 142 to the user.

It will be noted, that while FIG. 2 shows particular modules as part of another component (e.g., the click detector 214 and the hover detector 216 being part of the event detector 206), other embodiments may be provided where some modules of the system 200 shown as separate components are implemented as a single module. Conversely, embodiments may be provided where a component that is shown in FIG. 2 as a single module may be implemented as two or more separate components. Various operations performed by a system to facilitate on-line trading may be discussed with reference to FIG. 3.

Figure 3:
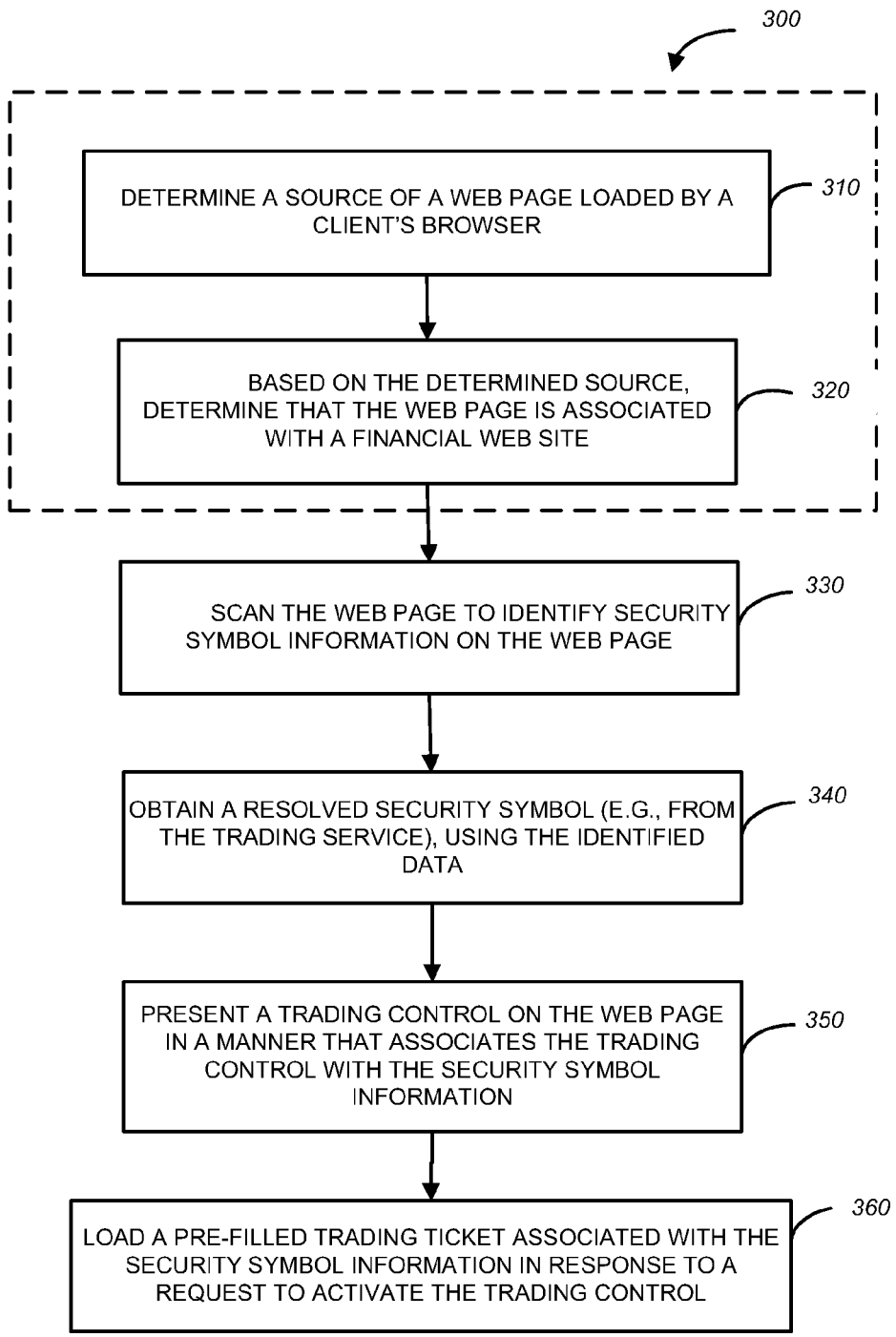
FIG. 3 is a flow chart of a method to provide access to a trading service from a third party web page utilizing a client-side trading access module, in accordance with an example embodiment.

FIG. 3 is a flow chart of a method 300 to provide access to a trading service from a third party web page, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the trading plug-in 114 or a trading access module 124 shown in FIG. 1.

As shown in FIG. 3, the method 300 commences at operations 310 and 320, where the web page source detector 210 of FIG. 2 determines a source of a web page loaded by a client's browser and, based on the determined source, identifies the web page as a relevant web page (e.g., a web page associated with a financial or investing website). The web page source detector 210 may obtain information regarding a source of a web page from a trading service running on a server system. As mentioned above, the operations for evaluating a web page to determine whether it is associated with a financial or investing website may be optional, and, in some embodiments, any web page loaded by the browser associated with a trading plug-in or a trading access module on the client system is processed to determine information that may potentially be resolved into a security symbol. The web page scanner 202 of FIG. 2 scans the web page, at operation 330, to identify security symbol information. At operation 340, the security symbol resolver 212 may submit a request including the identified security symbol information to the trading service to obtain a resolved security symbol (e.g., a confirmation that the identified data associated with a security symbol is associated with a valid security ticker symbol). In some embodiments, the initial scanning performed at operation 330 may be based on semantic patterns provided in the configuration file 220 of FIG. 2 and thus the resolving operation 340 is not performed.

At operation 350, the trading control generator 204 of FIG. 2 generates a trading control to be presented on the web page in a manner that associates the trading control with the security symbol information. In one embodiment, security symbol information is a stock symbol, CUSIP identifier, or the name of a company. Thus, a user that has an account with or has an interest in using the trading service provided at the server system 140 of FIG. 1 is permitted to access the trading service from any third party web page, by activating the trading control presented at operation 350. At operation 360, the trading ticket activator 218 of FIG. 2 loads a trading ticket associated with the security symbol information in response to a request to activate the trading control. The trading ticket may be pre-filled with the data associated with the security symbol information. The trading control may be activated by, e.g., clicking on the control, by detecting that a pointer is hovering over the trading control (detecting a hover event), etc. The pre-filled trading ticket may be utilized by a user to submit a security order, provided the user has an account with the trading service and a secure session with the trading service has been established. Example operations that are performed in the process of determining whether a user has an account with the trading system and whether a secure session with the trading service has been established for the user may be discussed with reference to FIG. 4.

Figure 4:
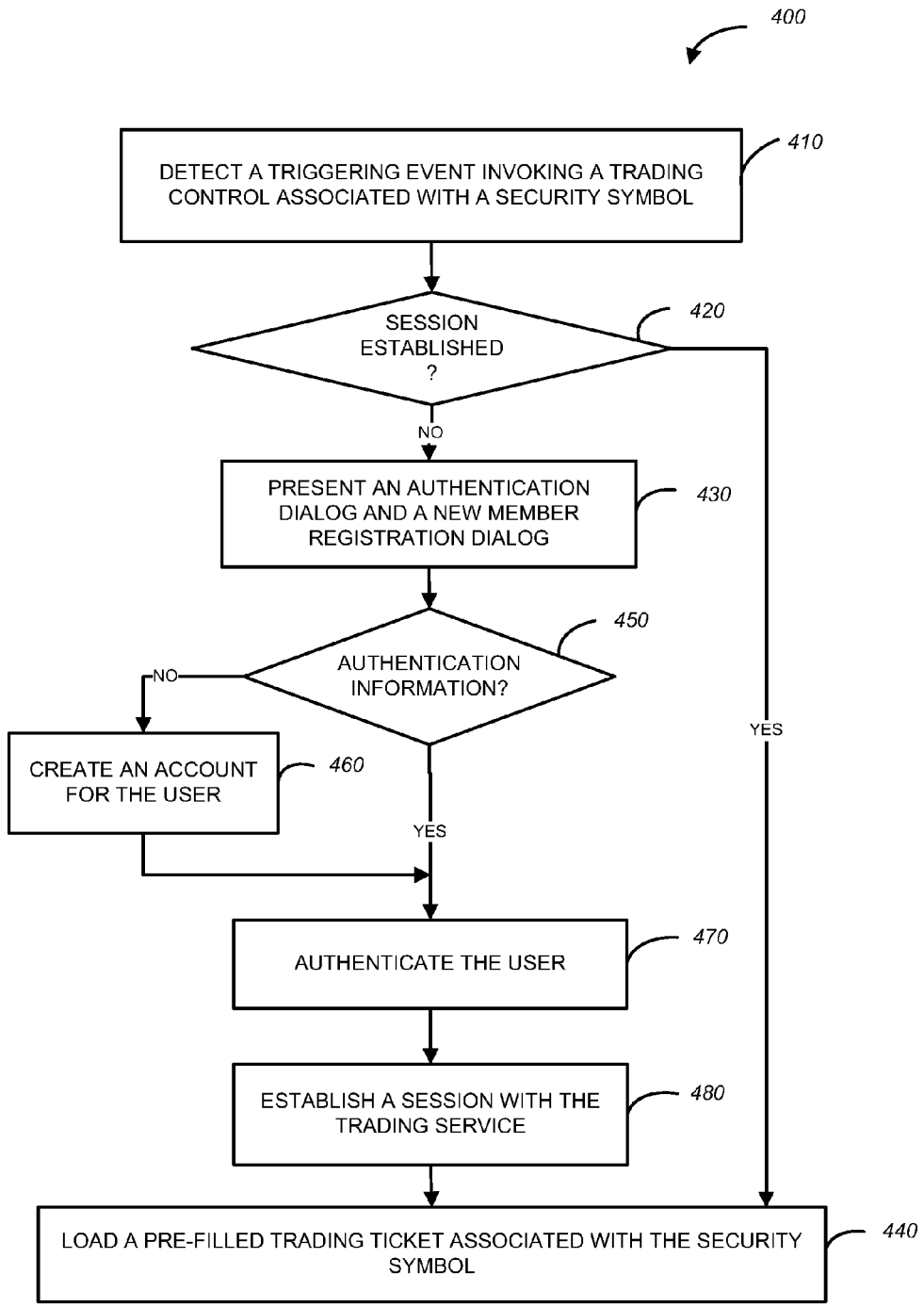
FIG. 4 is a flow chart of a method to facilitate loading of a pre-filled trading ticket.

FIG. 4 is a flow chart of a method 400 to facilitate loading of a pre-filled trading ticket, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the trading plug-in 114 or a trading access module 124 shown in FIG. 1.

As shown in FIG. 4, the method 400 commences at operations 410, where the event detector 206 of FIG. 2 detects a triggering event for the purpose of invoking a trading control associated with a security symbol. The session module 208 of FIG. 2 determines, at operation 420, whether a secure session with the trading service was established for the user. If the session has been established for the user, the trading ticket activator 218 of FIG. 2 loads a pre-filled trading ticket associated with the security symbol, at operation 440. As mentioned above, the trading ticket may be utilized for placing an order with the trading service.

If it is determined, at operation 420, that a session with the trading service has not been established for the user, the session module 208 presents a user with an authentication/registration interface that permits a user to either provide authentication information in order to establish a session with the trading service or, if the user does not yet have an account with the trading service, to create an account with the trading service, at operation 430. If it is determined, at operation 450, that the user submitted authentication information, the user is authenticated at operation 470, which may include sending an authentication request to the trading service and receiving a response from the trading service. If the authentication information was not provided and a request for a new user registration is detected, an account with the trading service is created for the user at operation 460.

When the user is authenticated at operation 470, the session module 208 invokes a secure session with the trading service for the user at operation 480, and the trading ticket activator 218 loads a pre-filled trading ticket. In some embodiments, data to be used for pre-filling a trading ticket may be obtained by the trading ticket activator 218 from the trading service (e.g., from the trading service module 142 residing at the server system 140 of FIG. 1. Some example operations performed at the trading service module 142 may be described with reference to FIG. 5 and FIG. 6.

Figure 5:
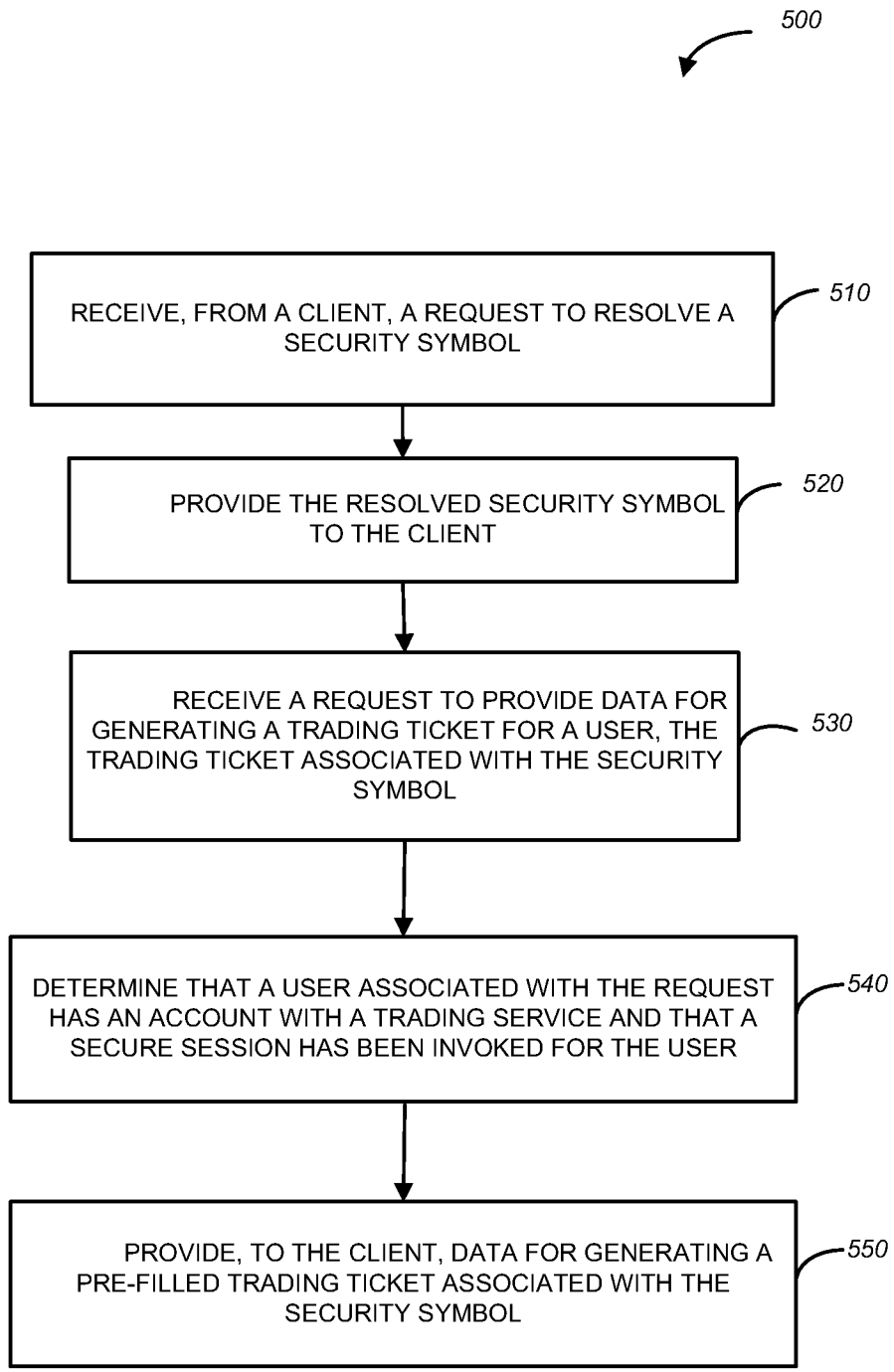
FIG. 5 illustrates example operations performed at a server system hosting a trading service module to provide data to a client-side trading access module, according to one example embodiment.

FIG. 5 is a flow chart of a method 500 to provide data to a client-side trading access module, according to one example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the trading service module 142 shown in FIG. 1.

As shown in FIG. 5, the method 500 commences at operation 510, where a request to resolve a security symbol is received from a trading access module (e.g., a trading plug-in) installed on a client computer system. A security symbol may be resolved by matching security symbol information received with the request with a record in the security symbol library 160 of FIG. 1. The resolved security symbol is provided to the client at operation 520. In response to a request to provide data for generating a trading ticket for a user (operation 530), the trading service determines whether the user has an account with the trading service and that a secure session with the trading service has been established for the user (operation 540). At operation 550, the trading service may provide to the client data for pre-filling the trading ticket for the user.

Figure 6:
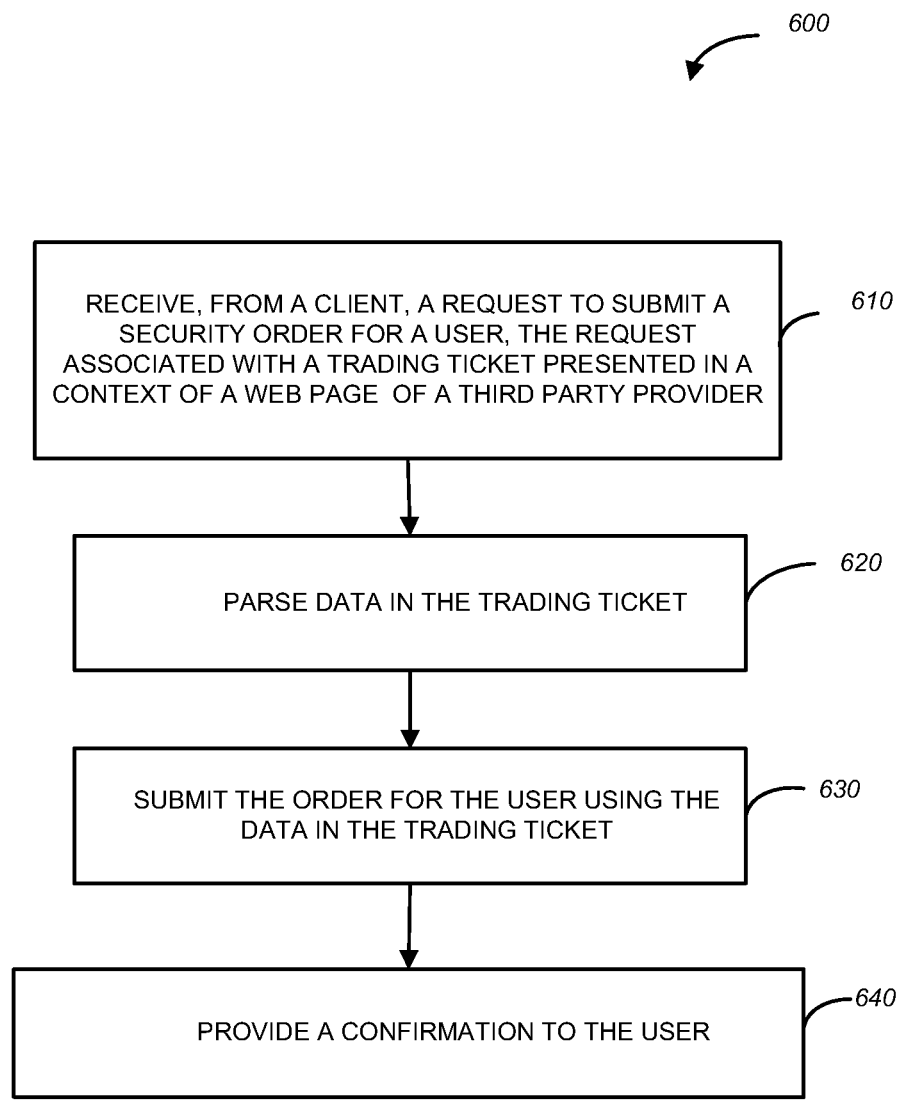
FIG. 6 illustrates example operations performed at a server system hosting a trading service module to submit a security order for a user, according to one example embodiment.

As mentioned above, the method and system described herein maybe utilized advantageously to permit a user to access the trading platform and submit orders from any third party web page. FIG. 6 illustrates a method 600 for submitting a security order for a user, where a trade process is initiated from a third party web page. As shown in FIG. 6, the trading service module 142 of FIG. 1 receives, from a client system, a request to submit a security order for a user, at operation 610. The request, in one example embodiment, is associated with a trading ticket presented in a context of a web page of a third party provider. At operation 620, the trading service module parses the data received from the trading ticket to determine and validate the data needed for submitting the order. The determined data is used by the trading service module 142 to submit the order for the user at operation 630.

At operation 640, the trading service module 142 provides a confirmation of the submitted order to the user.

Figure 7:
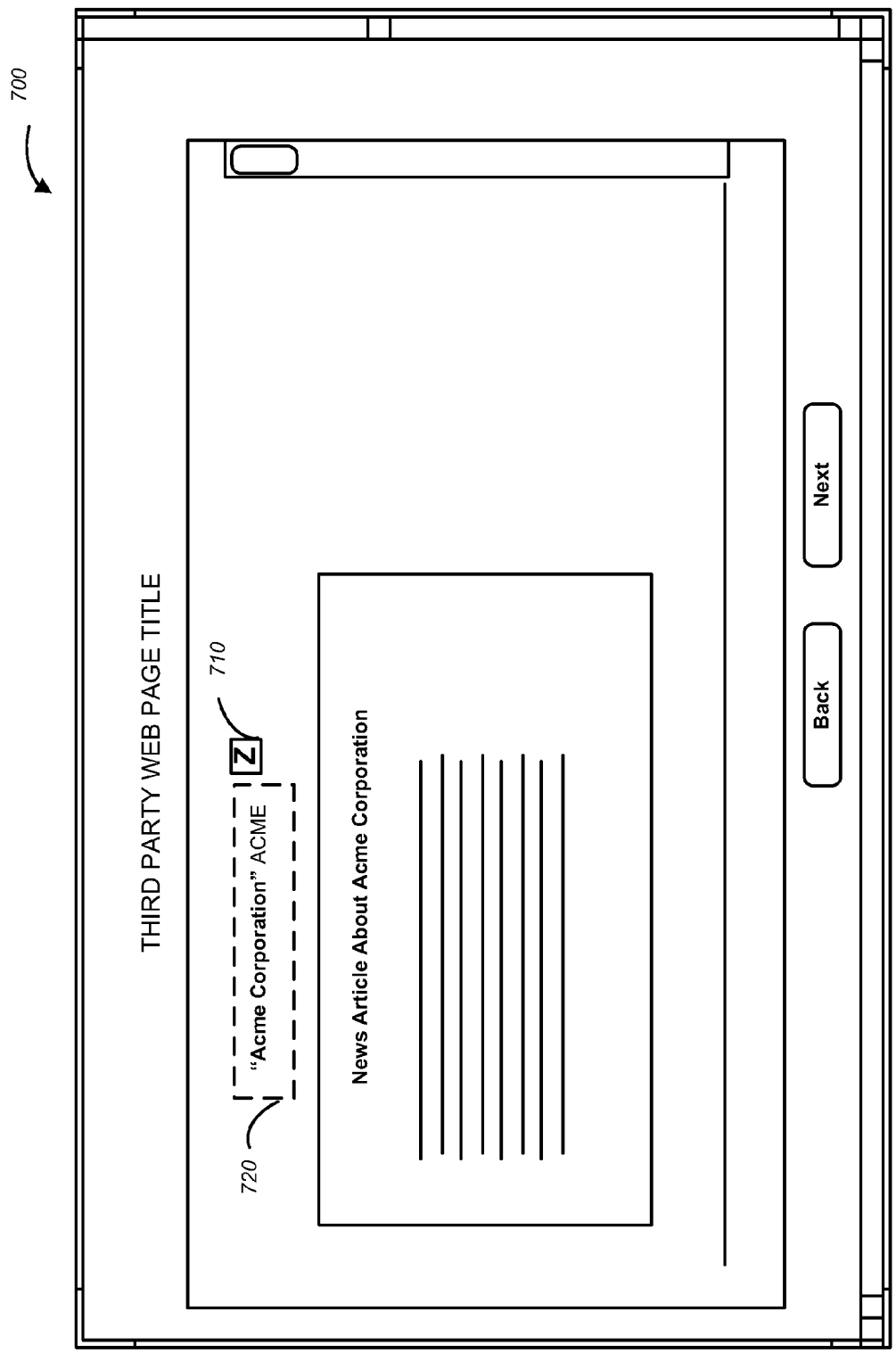
FIG. 7 illustrates a user interface including a trading control to provide access to the trading service from a web page provided by a third party, according to one example embodiment.
Figure 8:
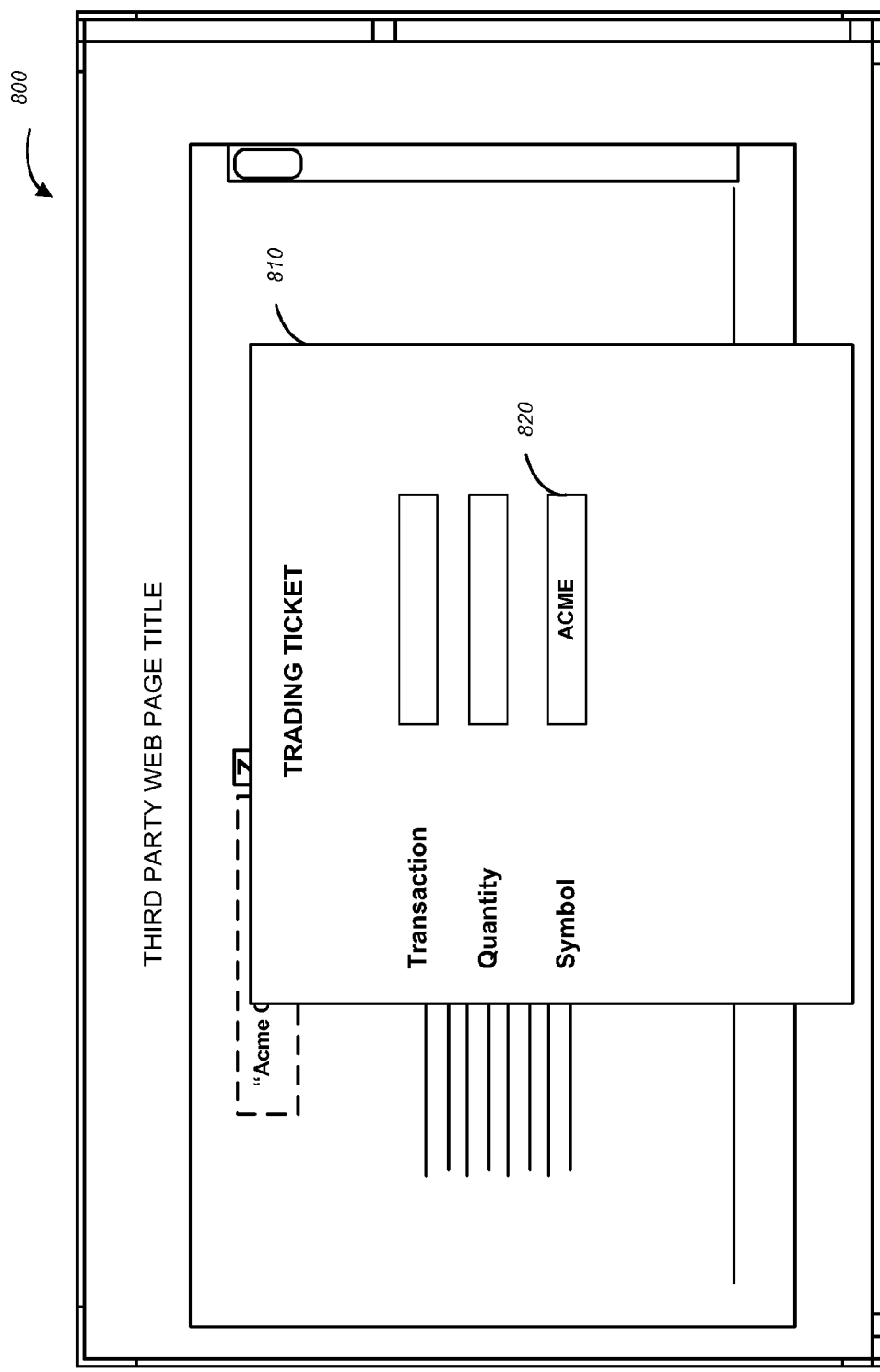
FIG. 8 illustrates a user interface including an overlaid trading ticket configured to provide access to the trading service, according to one example embodiment.

FIG. 7 illustrates a user interface 700 including a trading control 710. As shown in FIG. 7, the trading control 710 is displayed such that its position on the third party web page indicates that it is associated with a security or company identified in area 720. FIG. 8 illustrates a user interface 800 showing a trading ticket 810 overlaid over the third party web page area. The security symbol "ACME" shown in field 820 is pre-filled in the trading ticket 810 using the techniques described above. In addition, the trading ticket 810 can be pre-filled with relevant (financial) data associated with the security symbol, and relevant trading account information (not shown in 810).

As described above, a system for accommodating easy access to a trading service from web sites that are not associated with the provider of the trading service may be provided as a client-side trading access module. In some embodiments, the ability to access a third party trading service may be provided at a server hosting a web site. For example, a trading access module provided at a server system hosting a financial web site may be configured to augment web pages associated with the web site with a trading control, so that the users would have the benefit of accessing the trading service from those web pages without the need to install a trading access module on their client systems. A web page enhanced with one or more trading controls may be termed a trade-enabled web page.

Figure 9:
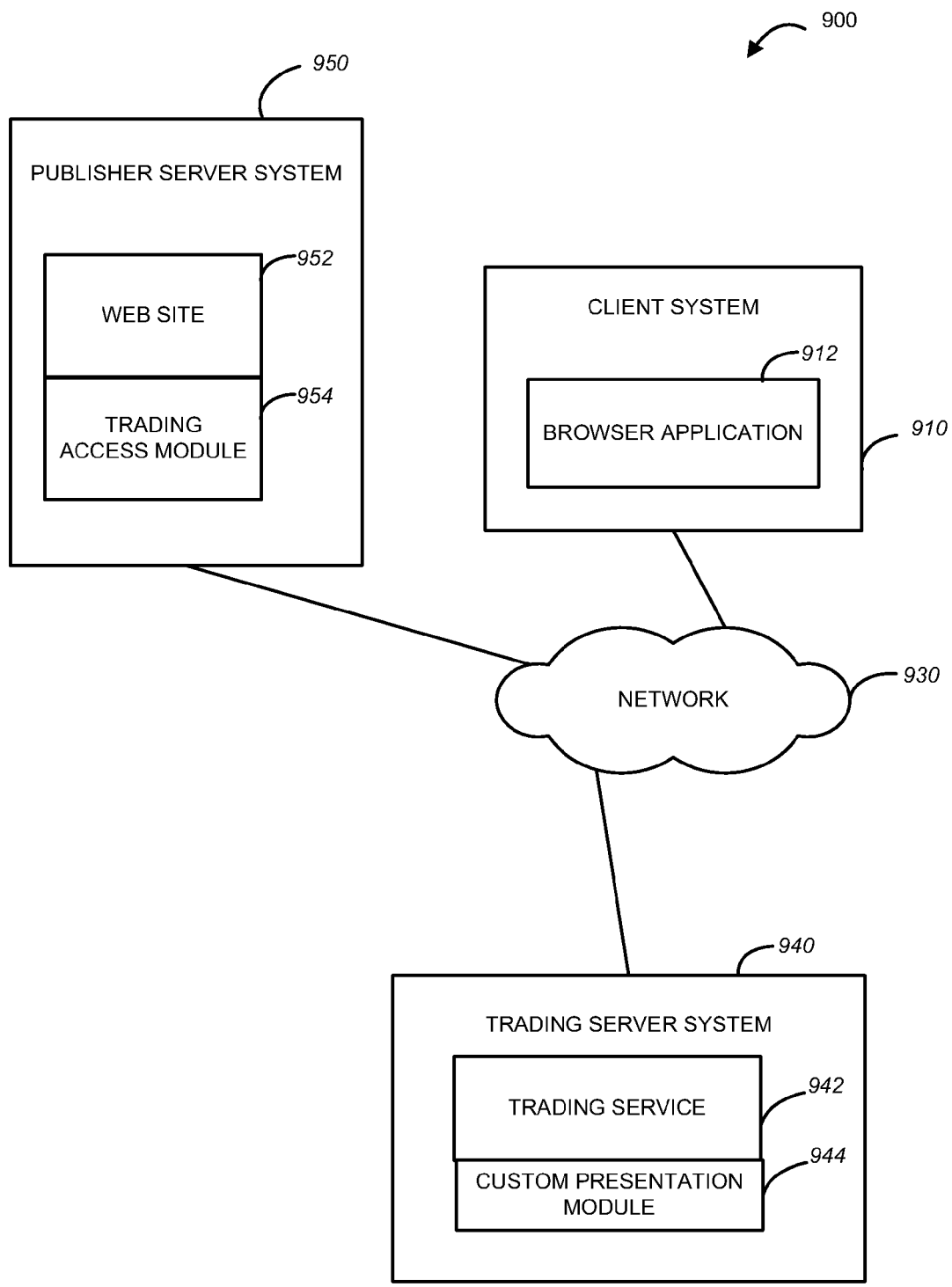
FIG. 9 is a diagrammatic representation of a network environment within which an example method and system to facilitate on-line trading using a certain trading platform may be implemented, illustrating a server side implementation of a trading access module.

In some embodiments, server-side implementation of a trading access module results in user experience that is similar to that provided by the client-side implementation of the trading access module. Thus, the user interfaces shown in FIGS. 7 and 8 may be utilized with the server-side implementation of a trading access module, as well as with the client-side implementation. FIG. 9 is a diagrammatic representation of a network environment 900 within which a server-side trading access module may be provided.

As shown in FIG. 9, a publisher server system 950 hosts a web site 952 and also hosts a trading access module 954. The trading access module 954 is configured to convert web pages that are part of the web site into trade-enabled web pages. A trade-enabled web page may be provided to a browser application 912 of a client system 910 and be used, at the client system 910, to access a trading service 942 in a manner similar to that discussed above, with reference to FIGS. 4-6. The trading access module 954 may be associated with the web site 952 in that it may be configured to process web pages that are part of the web site 952. An example server-side trading access module may be described with reference to FIG. 10.

Figure 10:
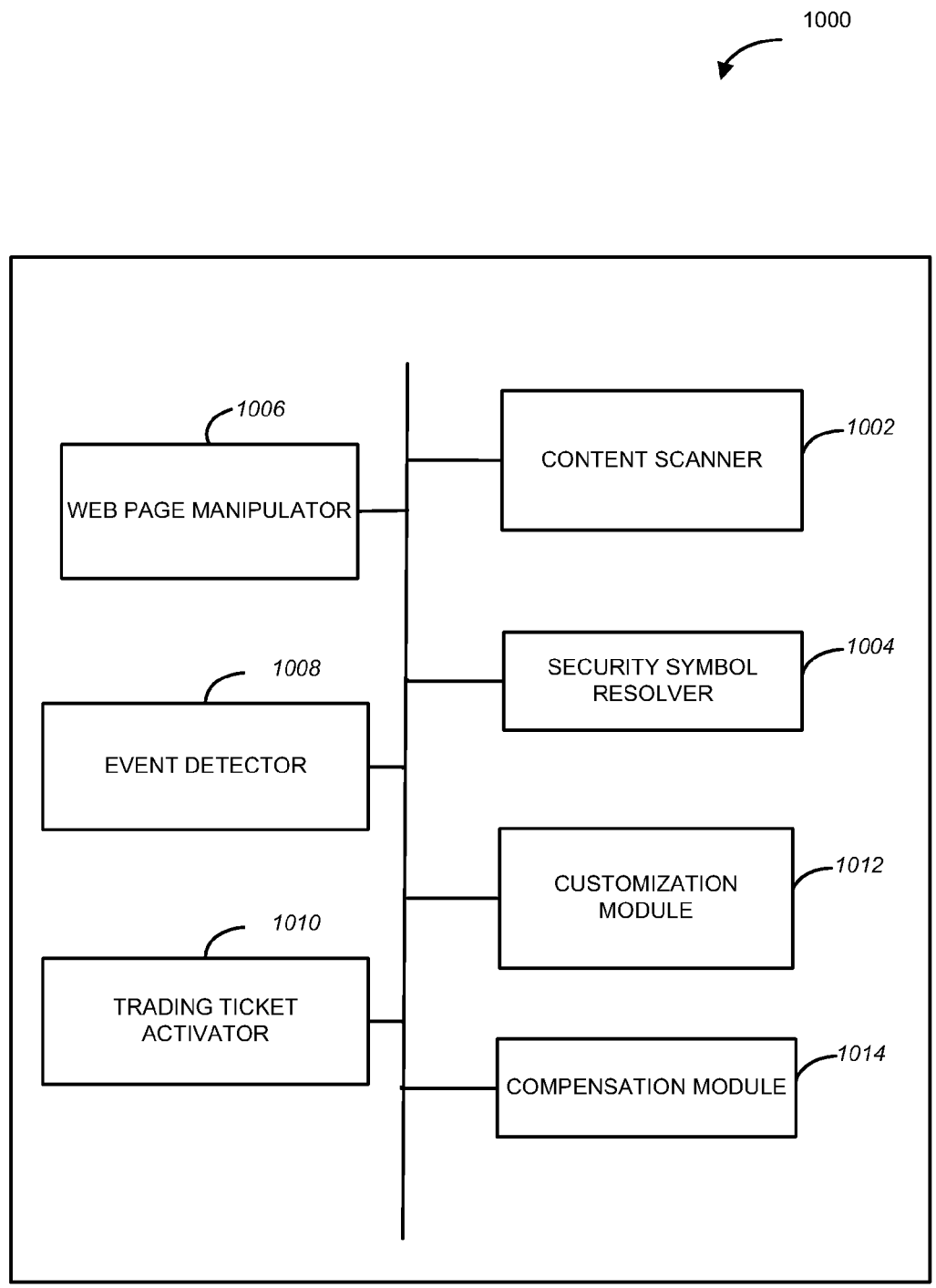
FIG. 10 is block diagram of a server-side trading access module, in accordance with one example embodiment.

FIG. 10 is a block diagram of a trading access module 1000 (implemented as a server-side module) to facilitate on-line trading, in accordance with one example embodiment. The trading access module 1000 may correspond to the trading access module 954 of FIG. 9. As shown in FIG. 10, the trading access module 1000 comprises a content scanner 1002, a security symbol resolver 1004, a web page manipulator 1006, an event detector 1008, and a trading ticket activator 1010. The content scanner 1002 may be configured to scan content of a web page to detect security symbol information. The security symbol resolver 1004 may be configured to determine a security symbol using the detected security symbol information. In one example embodiment, the content scanner 1002 and the security symbol resolver 1004 operate on content of existing web pages. In other embodiments, the content scanner 1002 and the security symbol resolver 1004 operate on content of new web pages that are being generated, such that a newly created page is coded to include a trading control if the content of a web page includes security symbol information. The web page manipulator 1006 may be configured to include, into a web page, a trading control associated with detected security symbol information. The trading control, when presented to a user on a web page, e.g., via a web browser application, may be utilized to access a trading service (that may be not associated with a web site from which the web page originates) and, if desired, to initiate trades. In one example embodiment, the trading control that is inserted into a web page may comprise computer code (such as, e.g., JavaScript or code) that can be provided either embedded in the mark-up language (e.g., HTML) representation of a web page or as a reference to a location from which the code can be downloaded.

The event detector 1008 may be configured to detect an event associated with the trading control triggered at a client system. For example, the event detector 1008 may be configured to detect that a user clicked on the trading control presented on the web page or detect a hover event (where a cursor is moved to a position on the web page overlapping with the position of the trading control). The trading ticket activator 1010 may be configured to cause launching of a trading ticket associated with the security symbol information. In one example embodiment, the trading ticket activator may be configured to communicate a message to the trading service associated with the trading control, the message including information for generating a pre-filled trading ticket by the trading service and communicating it to the client system. As described above, with respect to the client-side implementation of a trading access module, a trading ticket provided to a user in response to an activation of the trading control may be suitable for submitting an order for a security trade to the trading service.

Also shown in FIG. 1000 is a customization module 1012. The customization module 1012 may be configured to determine a network location of the trading service and to associate the trading control with the network location of the trading service. The customization module 1012 may also be configured to select (or obtain) a logo associated with the trading service and include the logo in the trading control. The logo can be presented on a trade-enabled web page to represent the trading service. The customization module 1012 may be utilized to allow the technology discussed herein to be used in a way that the trading access module is configurable with respect to which logo is presented to users as the trading control and which trading service is used when the trading control is activated. A compensation module 1014 shown in FIG. 10 may be configured to detect events associated with a user activating a trading control and determine compensation information based on the quality and amount of the detected events. For example, the publisher of trade-enabled web pages may be awarded a reward point every time a user's interaction with a trade control results in a user signing up with the trading service.

In one example embodiment, a custom presentation module may be included in or associated with the trading service 942 of FIG. 9 (shown as custom presentation module 944 in FIG. 9). The custom presentation module 944 may be configured to receive a message from a publisher server 950 of FIG. 9 when a client-side event associated with a trading control is detected at the publisher server 950. In response to such message, the custom presentation module 944 may identify a publisher service associated with the publisher server 950, access customized presentation information indicative of the publisher service, and use the customized presentation information when providing a pre-filled trading ticket to the client. Thus, a user who is accessing a trade-enabled web page provided by a publishing service may be permitted to initiate trades without leaving the trade-enabled web page, while a trading ticket (provided from a trading service that is operated independent from the publishing service) may have look and feel of the publishing service. The trading service 942 of FIG. 9 may also include a notification module and a session module (not shown). The notification module may be configured to receive, from the trading service messages associated with the disposition of respective submitted orders and generate notifications for the user, e.g., in the form of a pop-up window, status bar extension, sound, or otherwise. For example, the notification module may report to the client, from which a trading control was activated and a trading operation initiated, that the submitted order was accepted, rejected, executed, or cancelled and cause an appropriate notification to be displayed to the user. The session module may be configured to determine whether a user associated with the event associated with the trading control has an account with the trading service and whether a secure session with the trading service has been established for the user.

Returning to FIG. 10, it will be noted, that while FIG. 10 shows particular modules as part of another component (e.g., the click detector 1014 and the hover detector 1016 being part of the event detector 1006), other embodiments may be provided where some modules of the system 1000 shown as separate components are implemented as a single module. Conversely, embodiments may be provided where a component that is shown in FIG. 10 as a single module may be implemented as two or more separate components. Various operations performed by a system to facilitate on-line trading may be discussed with reference to FIG. 11.

Figure 11:
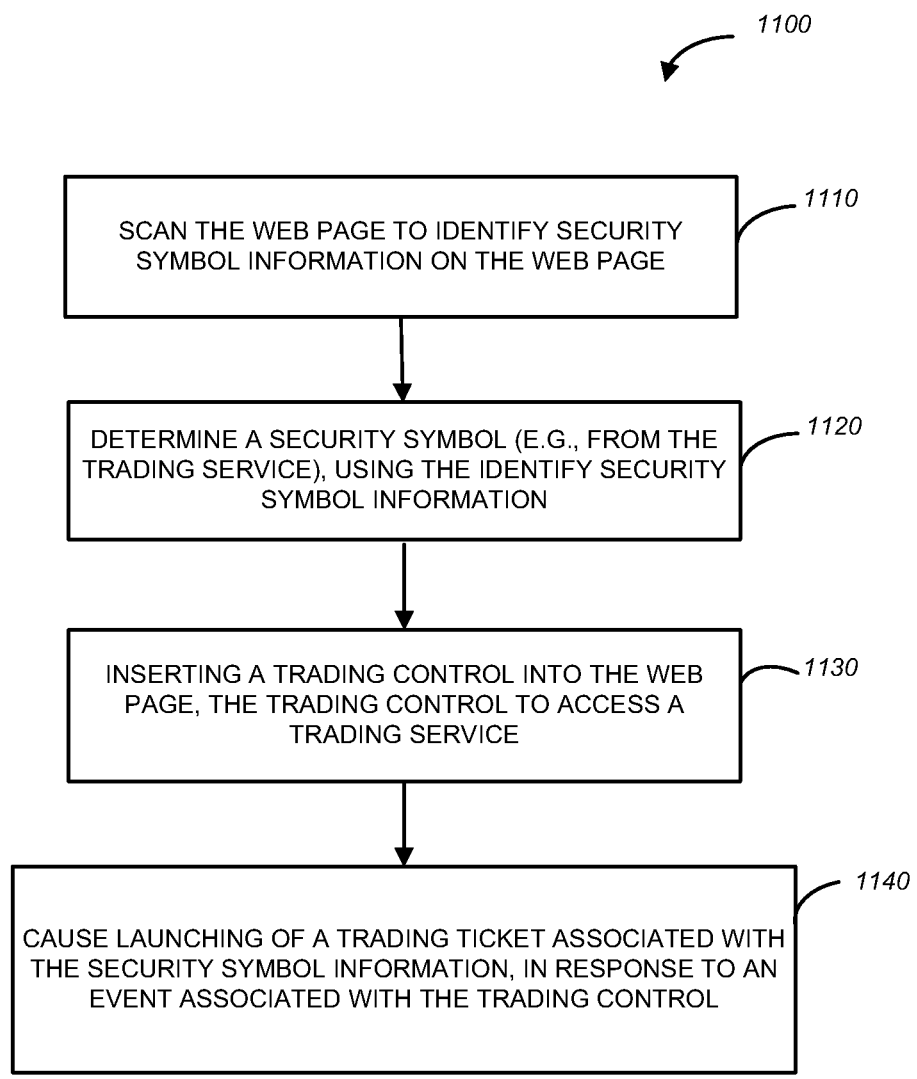
FIG. 11 is a flow chart of a method to provide access to a trading service from a third party web page utilizing a server-side trading access module, in accordance with an example embodiment.

FIG. 11 is a flow chart of a method 1100 to provide access to a trading service from a third party web page, according to one example embodiment. The method 1100 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the trading access module 954 shown in FIG. 9.

As shown in FIG. 11, the method 1100 commences at operations 1110, where the content scanner 1002 of FIG. 10 scans content of a web page provided as part of a web site to detect security symbol information. At operation 1120, the security symbol resolver 1004 determines a security symbol using the detected security symbol information. At operation 1130, the web page manipulator 1006 of FIG. 10 inserts a trading control into the web page to produce a trade-enabled web page. As explained above, the content scanner 1002 may be configured to scan content of existing web pages, as well as content that is yet to be added into a web page. A trading control thus may be added to a web page at the time when the web page is being created or at a later time, e.g., in response to a request from a browser application. Trade-enabled web pages provided by the publisher server system 950 of FIG. 9 may be provided to a browser application of a client system.

At operation 1140, the trading ticket activator 1010 causes launching of a trading ticket associated with the security symbol information in response to an event associated with the trading control that is present on a trade-enabled web page. The trading ticket launched at the client system that is displaying the trade-enabled web page is suitable for initiating a trade from the client system via the trading service associated with the trading control. As explained above, when a user of a client system activates a trading control, the event detector 1008 of FIG. 10 detects the event and communicated a message to the trading service. In response to the message, the trading service may initiate communications with the client system to permit the user to start a session with the trading service, to sign up with the trading service, or to initiate a trade. The user is thus permitted to interact with the trading service without leaving the web page provided by the publishing service.

It will be noted that some of the modules included in a server-side trading access module may be the same as some of the modules included in a client-side trading access module. Conversely, not all of the modules included in a server-side trading access module may be included in a client-side trading access module and vice versa.

While some embodiments have been described with reference to examples of initiating trades in securities by activating a trading control from a trade-enabled web page, the techniques described herein may be utilized advantageously to permit users to access a service provided by a trading service provider (e.g., any entity permitting users to participate in electronic transactions) from a trade-enabled web page. For example, a trading service may be an on-line store, while a publishing service may be a host of an on-line blog. Content available on the blog pages may include phrases that may be identified by the trading module 1000 as related to a tradable item. A tradable item may be goods or a service, e.g., the title of a book or a magazine. A trading service may be provided by, e.g., an on-line book seller or an on-line magazine subscription service. A trading ticket may be an order form. For example, where a tradable item is a book, the trading ticket presented to the user who activated the associated trading control may be the book title and the price. A publishing service that allows access to a trading service by providing trade-enabled web pages to users may be operated independent from the trading service.

Figure 12:
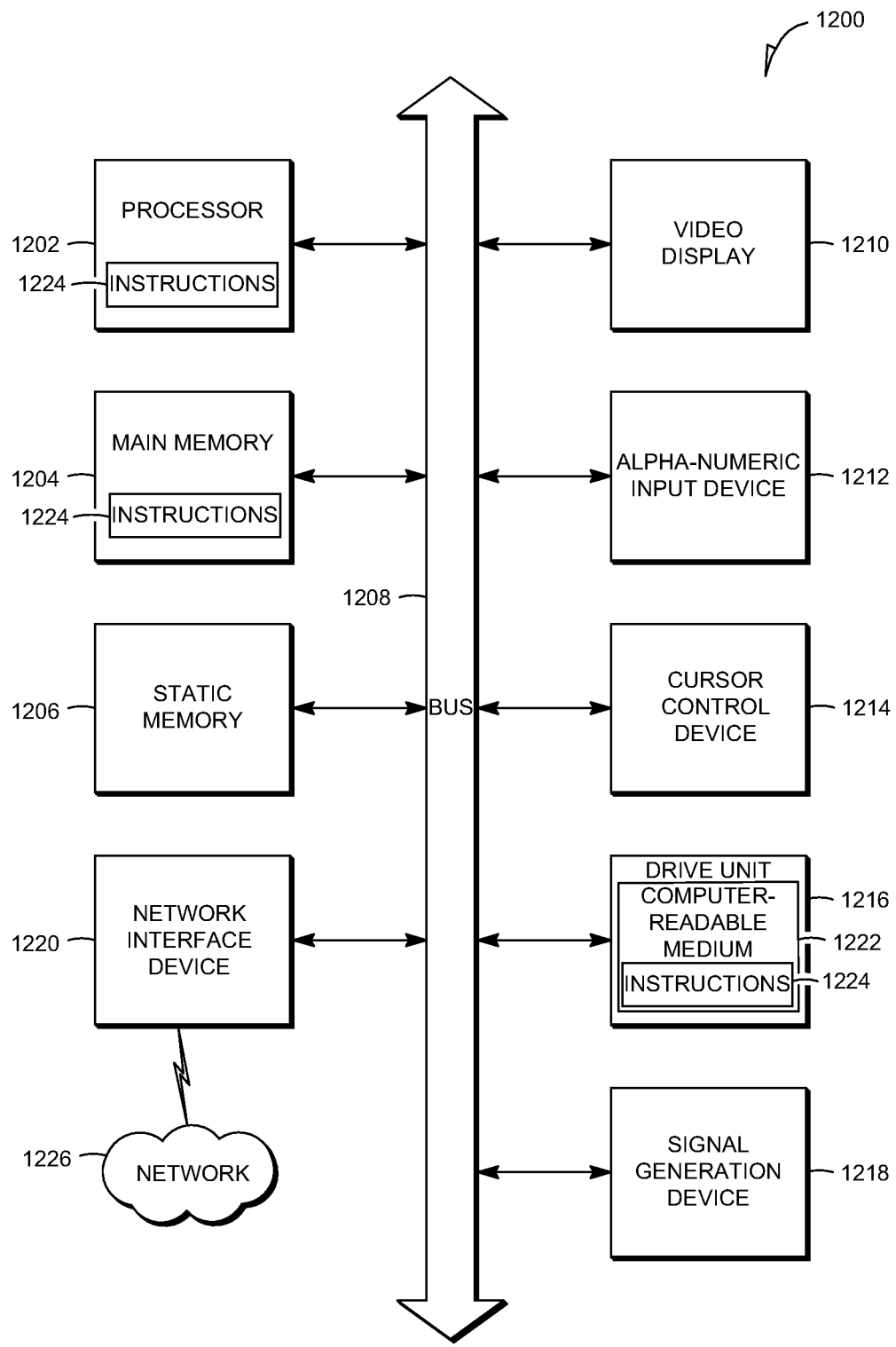
FIG. 12 is a diagrammatic representation of an example machine in the form of a computer system within which a set of instructions, for causing the machine to perform any one or more of the methodologies discussed herein, may be executed.

FIG. 12 shows a diagrammatic representation of a machine in the example form of a computer system 1200 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alpha-numeric input device 1212 (e.g., a keyboard), a user interface (UI) navigation device 1214 (e.g., a cursor control device), a disk drive unit 1216, a signal generation device 1218 (e.g., a speaker) and a network interface device 1220.

The disk drive unit 1216 includes a machine-readable medium 1222 on which is stored one or more sets of instructions and data structures (e.g., software 1224) embodying or utilized by any one or more of the methodologies or functions described herein. The software 1224 may also reside, completely or at least partially, within the main memory 1204 and/or within the processor 1202 during execution thereof by the computer system 1200, with the main memory 1204 and the processor 1202 also constituting machine-readable media.

The software 1224 may further be transmitted or received over a network 1226 via the network interface device 1220 utilizing any one of a number of well-known transfer protocols (e.g., Hyper Text Transfer Protocol (HTTP)).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system to facilitate on-line trading has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A computer-implemented system to facilitate on-line trading, the system comprising:
   a content scanner to scan a web page to detect security symbol information;
   a security symbol resolver to determine a security symbol using the detected security symbol information;
   a web page manipulator to insert a trading control into the web page to produce a trade-enabled web page, the trading control to access a trading service;
   an event detector to detect an event associated with the trading control, the event triggered at a client system;
   a session module to responsive to the event associated with the trading control:
      determine that a secure session with the trading service has not been established for a user associated with the event associated with the trading control; and
      cause presentation of an authentication dialog or the user; and
   a trading ticket activator to cause launching of a trading ticket associated with the security symbol information, the trading ticket suitable for initiating a trade from the client system using the trading service.

2. The system of claim 1, wherein the web page is associated with a provider of a web site, the provider of the web site being distinct from a provider of the trading service.

3. The system of claim 1, wherein the content scanner, the security symbol resolver, and the web page manipulator are provided at a server system hosting a web site that provides the web page.

4. The system of claim 3, wherein the web page manipulator is to insert, into the web page, computer code implementing the trading control.

5. The system of claim 1, wherein the content scanner, the security symbol resolver and the web page manipulator are included in a browser plug-in provided at a client system.

6. The system of claim 5, wherein the web page manipulator is to visually associate the trading control with the security symbol information on the web page.

7. The system of claim 1, wherein the trading control includes a trade icon, the trade icon to be displayed on the web page in a manner to associate visually the trading control with the detected security symbol information.

8. The system of claim 1, comprising a session module to:
determine that a user associated with the event associated with the trading control has an account with the trading service, and
determine that a secure session with the trading service has been established for the user.

9. The system of claim 1, wherein the security symbol resolver is to:
communicate, to the trading service, a request including the security symbol information; and
receive a resolved security symbol from the trading service.

10. The system of 1, wherein the security symbol information is a name of a company.

11. The system of claim 1, wherein the trading ticket activator is to provide a message related to the event associated with the trading control to a custom presentation module associated with the trading service, the custom presentation module to:
determine a publishing service associated with message;
access customized presentation information associated with the publishing service; and
apply the customized presentation information to the trading ticket.

12. The system of claim 11, wherein the trading service is to provide a notification to the client system regarding an outcome of the initiated trade.

13. The system of claim 1, wherein the event associated with the trading control comprises a click event.

14. The system of claim 1, comprising a customization module to:
determine a network location of the trading service;
associated the trading control with the network location of the trading service;
selecting a logo associated with the trading service; and
including the logo in the trading control, the logo to be presented on the web page to represent the trading control.

15. A computer-implemented method to facilitate on-line trading, the method comprising:
using one or more processors to perform operations of:
scanning a web page to detect security symbol information, the web page associated with a publishing service;
determining a security symbol using the detected security symbol information;
inserting a trading control into the web page to produce a trade-enabled web page, the trading control to access a trading service, the trading service operated independent of the publishing service;
detecting an event associated with the trading control, the event triggered at a client system;
wherein responsive to the event associated with the trading control:
determining that a secure session with the trading service has not been established for a user associated with the event associated with the trading control; and
causing presentation of an authentication dialog for the user; and
causing launching of a trading ticket associated with the security symbol information, the trading ticket suitable for initiating a trade from the client system using the trading service.

16. The system of claim 15, wherein the inserting of the trading control into the web page to produce a trade-enabled web page is performed at a server system hosting a web site, the web site including the web page.

17. The method of claim 16, comprising providing the trade-enabled web page to a browser application in response to a request for the web page.

18. The method of claim 15, wherein the inserting of the trading control into the web page comprises inserting, into the web page, computer code implementing the trading control.

19. A machine-readable non-transitory storage medium to facilitate on-line trading, wherein the machine-readable non-transitory storage medium having instruction data to cause a machine to:
scan a web page to detect security symbol information;
determine a security symbol using the detected security symbol information;
insert a trading control into the web page to produce a trade-enabled web page, the trading control to access a trading service;
detect an event associated with the trading control, the event triggered at a client system;
wherein responsive to the event associated with the trading control:
determine that a secure session with the trading service has not been established for a user associated with the event associated with the tradig control; and
cause presentation of an authentication dialog for the user; and
cause launching of a trading ticket associated with the security symbol information, the trading ticket suitable for initiating a trade from the client system using the trading service.

20. A computer-implemented system to facilitate on-line trading, the system comprising:
a content scanner to scan content of a web page to detect information associated with a tradable item, the web page associated with a publishing service;
a resolver to determine tradable item identifier using the detected information associated with a tradable item;
a web page manipulator to insert a trading access control into the web page to produce a trade-enabled web page, the trading access control to access a trading service, the publishing service being operated distinctly from the trading service;
an event detector to detect an event associated with the trading control, the event triggered at a client system;
a session module to responsive to the event associated with the trading control:

determine that a secure session with the trading service has not been established for a user associated with the event associated with the trading control; and cause presentation of an authentication dialog for the user; and a trading window generator to cause launching of a trading window, the trading window suitable for initiating a transaction with respect to the tradable item using the trading service.

21. The system of claim 20, wherein the tradable item is from a plurality of goods and services.

22. The system of claim 20, wherein the tradable item is a security.

23. The system of claim 20, wherein the trading service is an on-line seller service.

24. The system of claim 20, wherein the trading service is an on-line securities trading service.

25. The system of claim 20, wherein the content scanner is to scan content of a web page to detect information associated with a tradable item in response to a request to generate the web page.

26. The system of claim 20, wherein the content scanner is to scan content of a web page to detect information associated with a tradable item in response to a request from a browser application to provide the web page to the browser application.

27. A computer-implemented system to facilitate on-line trading, the system comprising:

a content scanner to scan a web page to detect security symbol information:

a security symbol resolver to determine a security symbol using the detected security symbol information;

a trading access module to present a trading control to associate visually the trading control with security symbol information visible on a web page, the trading control to access a trading service;

an event detector to detect an event associated with the trading control;

a session module to responsive to the event associated with the trading control:

determine that a secure session with the trading service has not been established for a user associated with the event associated with the trading control; and cause presentation of an authentication dialog for the user; and a trading ticket activator to launch a trading ticket associated with the security symbol information, the trading ticket suitable for submitting an order using the trading service.

28. The system of claim 27, wherein the c trading access module, the event detector, and a trading ticket activator are provided at a server system hosting a web site that provides the web page.

29. A computer-implemented method to facilitate on-line trading, the method comprising:

using one or more processors to perform operations of:

scanning a web page to detect security symbol information;

determining a security symbol using the detected security symbol information;

presenting a trading control to associate visually the trading control with security symbol information visible on a web page, the trading control to access a trading service;

detecting an event associated with the trading control;

wherein responsive to the event associated with the trading control:

determining that a secure session with the trading service has not been established for a user associated with the event associated with the trading control; and causing presentation of an authentication dialog for the user; and launching a trading ticket associated with the security symbol information, the trading ticket suitable for submitting an order using the trading service.

30. A machine-readable non-transitory storage medium to facilitate on-line trading, wherein the machine-readable non-transitory storage medium having instruction data to cause a machine to:

scan a web page to detect security symbol information;

determine a security symbol using the detected security symbol information;

present a trading control to associate visually the trading control with security symbol information visible on a web page, the trading control to access a trading service;

detect an event associated with the trading control;

wherein responsive to the event associated with the trading control:

determine that a secure session with the trading service has not been established for a user associated with the event associated with the trading control; and cause presentation of an authentication dialog for the user; and launch a trading ticket associated with the security symbol information, the trading ticket suitable for submitting an order using the trading service.

* * * * *

UNITED STATES PATENT AND TRADEMARK OFFICE
CERTIFICATE OF CORRECTION

PATENT NO. : 8,463,652 B2  
APPLICATION NO. : 12/779255  
DATED : June 11, 2013  
INVENTOR(S) : de Boer et al.

Page 1 of 1

It is certified that error appears in the above-identified patent and that said Letters Patent is hereby corrected as shown below:

Title page 2, in column 2, under "Other Publications", line 20, delete "Mailed" and insert --mailed--, therefor In the Claims In column 12, line 64, in claim 1, delete "or" and insert --for--, therefor In column 13, line 35, in claim 10, before "1", insert --claim--, therefor In column 14, line 45, in claim 19, delete "tradig" and insert --trading--, therefor In column 15, line 30, in claim 27, delete "information:" and insert --information;--, therefor In column 16, line 1, in claim 28, after "the", delete "c", therefor Signed and Sealed this  
Fifth Day of November, 2013

Teresa Stanek Rea  
*Deputy Director of the United States Patent and Trademark Office*